United States Patent [19]
Zubeldia et al.

[11] Patent Number: 6,044,462
[45] Date of Patent: Mar. 28, 2000

[54] METHOD AND APPARATUS FOR MANAGING KEY REVOCATION

[75] Inventors: Pedro Zubeldia, Kaysville; Gordon W. Romney, Salt Lake City, both of Utah

[73] Assignee: ARCANVS, Salt Lake City, Utah

[21] Appl. No.: 08/832,371

[22] Filed: Apr. 2, 1997

[51] Int. Cl.[7] .................................................... H04L 9/00
[52] U.S. Cl. ............................................ 713/158; 380/30
[58] Field of Search ........................ 380/25, 30; 713/158

[56] References Cited

U.S. PATENT DOCUMENTS 5,371,794 12/1994 Diffie et al. ................................ 380/30
5,687,235 11/1997 Perlman et al. ........................... 380/30
5,745,574 4/1998 Muftic ....................................... 380/25
5,889,862 3/1999 Kazuo et al. ............................. 380/30

*Primary Examiner*—Salvatore Cangialosi
*Attorney, Agent, or Firm*—The Hecker Law Group

[57] ABSTRACT

The validity status of a digital certificate is accessible even after a certificate has expired. Certificate validity status is stored and retained in a certificate status history database that allows for ease of certificate status retrieval. The validity status of a certificate can be determined for a specified point in time. It is no longer necessary to review multiple certificate revocation lists to determine the validity status of a digital certificate. Status historical information regarding multiple certificate renewals, suspensions and reinstatements can also be obtained from the database.

20 Claims, 7 Drawing Sheets

METHOD AND APPARATUS FOR MANAGING KEY REVOCATION

BACKGROUND OF THE INVENTION

1. Field of the Invention

This invention relates to the field of electronic commerce, and more particularly to a method and apparatus for managing key revocation in a cryptographic environment.

2. Background Art

In a computerized environment, a digital certificate ("certificate") is used to attach a degree of assurance to information (e.g., a cryptographic key) associated with a certificate. A certificate is digitally signed by the entity that offers it as a voucher for the authenticity of the information. If the certificate is issued by a trusted third party, it is assumed that its information content is valid. However, as is discussed below, largely due to information "aging", current techniques for determining the validity of a certificate are inadequate.

Digital Signatures

One of the purposes of a digital signature is to link an electronic document with an owner of the private key corresponding to a particular public key. Additionally, a digital signature can be used to determine whether an electronic document has been altered during transmission of the document from the sender to the recipient.

One form of digital signature uses a message digest. A message digest is a value that is generated when an electronic document is passed through a one way encryption process ("digesting process") such as a hashing routine. An ideal digesting process is one for which the probability that two different electronic documents will generate the same message digest is near zero. In this form of digital signature, both the sender and the recipient need to know which digesting process is being used. The sender generates the electronic document, and generates a message digest by passing the electronic document through the digesting process. The sender encrypts the resulting message digest with the sender's private key. The result, the encrypted message digest, then becomes the digital signature of the electronic document. The digital signature may be appended to the electronic document or kept as a separate entity.

Digital Certificates

Certificates have been devised to address some of the uncertainties inherent in public key cryptography. Public key cryptography uses a two key pair, typically referred to as a public key and a private key. These two keys are different but constitute a matched key pair. In normal practice, the owner of a key pair keeps the private key secret, but freely distributes the public key.

One uncertainty relates to the identity of the owner of the private key that corresponds to the public key, because the public key is widely available and subject to malicious modification. It is possible, for example, that a public key may be circulated that fraudulently purports to be the public key of party A, but the corresponding private key of which is actually held by party B.

Certificates are intended to provide a degree of assurance as to the identity of the holder of the private key corresponding to a particular public key. A certificate constitutes a certification by a certification authority ("CA") that a particular public key is the public key of a particular entity, and that this entity is the holder of the corresponding private key. That is, a certificate can be used to certify the authenticity of information such as a public key.

The degree of assurance provided by a certificate depends on a number of factors, including the reputation of the CA issuing the certificate, the thoroughness of the procedures used by the CA in issuing the certificate, and the degree of confidence in the CA's public key. Some CAs issue different levels of certificates, corresponding to different levels of investigation performed by the CA during evaluation of an application.

The certificate may be appended to an electronic document, or the recipient of an electronic document may obtain a copy of the certificate from the issuing CA or other certificate repository.

The certificate itself is an electronic document. Although a variety of formats exist, a certificate typically includes, among other items, the name of the certification authority, the name of the certificate holder, the expiration date of the certificate, the public key of the certificate holder, and the digital signature of the certification authority. The certificate constitutes a certification by the certification authority that the holder of the certificate is the owner of the public key specified in the certificate, and, by implication, is therefore the holder of the corresponding private key.

For example, a certificate is issued by a CA (e.g., Verisign) to warrant to a party, A, that a cryptographic key belongs to another party, B. The CA, C, is trusted by both A and B. Without a certificate, another party, D, could send a key to A in the name of B. A would use D's key to encrypt messages that A intended to be accessible only by B. Instead, D could access the message by intercepting and deciphering it using the key it sent to A. If, however, A obtained B's key from C contained in a certificate, there is little opportunity for D to intercede with a counterfeit key.

FIG. 1 provides an example of a certificate. Certificate 100 contains a Version Number 110 that identifies the certificate format. Serial Number 120 is unique within a particular CA and identifies certificate 100. Digital Signature Algorithm identifier 130 identifies the algorithm used to create signature 190 and any parameters needed for the specified algorithm. Certification Authority 140 identifies the CA that issued certificate 100 and signed it with Signature 190.

Period of Validity 150 specifies the dates in which certificate 100 is operational (i.e., in its operational period). Certificate 100 is not valid until a certain date and becomes invalid after a certain date. Certificate 100 contains information associated with a user. The user's identification (e.g., name) is contained in User Name 160. The user's public key is contained in the certificate in User Public Key 170. The certificate may also contain Other User Data 180, such as E-mail address or date of birth of the user.

Signature 190 is used by a recipient to authenticate certificate 100. Signature 190 can be generated using a number of different techniques. For example, signature 190 can be the result of computing a message digest of fields 110-180 of certificate 100, and encrypting the message digest using the CA's private key. The CA's public key is used to verify the signature of certificate 100.

A certificate can be made available directly from a CA. That is, A can contact the CA to obtain B's certificate. Receiving B's certificate directly from the CA increases the chance that it is a valid certificate. However, B's certificate may also be available at a repository other than the CA such as a local certificate database that is accessible to A via a network.

The certificate provided by a CA has an operable life. A CA warrants the accuracy of the information during that time period, a period of validity. The CA does not warrant information before or after the period of validity.

A certificate contains the dates (see period of validity 150 in FIG. 1) during which it is operational. During its operational period, a certificate is valid unless it has been suspended or revoked. A suspension is a temporary hold that is placed on a certificate. If a certificate is revoked, the operational period of the certificate is permanently terminated from the time of revocation forward. After its operational period, a certificate is considered to be expired. A CA reports the state of a certificate that has been revoked or suspended in a certificate revocation list ("CRL").

Digital Certificate Revocation and CRLs

If a certificate is compromised in some manner, it must be rendered inoperable (e.g., revoked) during its validity period. To provide notification of certificate revocations, a CA provides a list of certificates that have been revoked in a CRL. A CRL is issued on a periodic basis which can be as frequently as daily. It is necessary to consult each and every CRL that has been issued by the CA during the validity period of the certificate, to determine whether a certificate obtained from the CA was revoked prior to its expiration. A CRL is typically provided as a print out or can be sent to a user in the form of an electronic message. Distribution of a CRL introduces delay into the notification process.

During its period of validity, a certificate is stored in a certificate database. It is possible to query the repository to determine whether a certificate that is still in its period of validity has been revoked or suspended. When a certificate is no longer in its period of validity, it is removed from the certificate database. There is no ability to perform an automated search of a certificate to determine its validity status ("status") at a particular point in time once it is outside its period of validity. If, for example, it might be necessary to determine whether a certificate was still in effect (i.e., not revoked or suspended) five years ago.

The only record that is currently available of the status of a certificate outside its validity period is contained in the set of CRLs issued by the CA. To determine the status of a certificate that is no longer in its validity period, it is necessary to consult each of the issued CRLs to determine whether the certificate is listed in one of the CRLs. This is a process that is susceptible to errors. The set of CRLs that is consulted must contain all of the issued CRLs to determine with any certainty the status of a certificate. Further, each CRL in the set of CRLs must be reviewed to determine whether it references the certificate. The volume of the CRLs that must be maintained by each user grows very large, as it becomes necessary to check a certificate against the CRLs even years after its expiration date. CRLs are never truly retired.

If the certificate is found in one of the CRLs, it is possible to determine the status of the certificate at the time of that CRL. If, however, the certificate is not included in one of the CRLs consulted, the soundness of the conclusion that the certificate is valid rests on whether any CRL or any entry in a CRL that identifies the certificate was overlooked during the process. It is possible that notification of revocation of the certificate is contained in a missing CRL. Further, the task is tedious and prone to error. Therefore, even if the set of CRLs is complete, it is possible to overlook an entry in one of the CRLs that references the certificate in question. There is currently no mechanism for storing and retrieving information about the status of a certificate whether or not the certificate is within its validity period.

A certificate is valid during its operational period. Before or after its operational period, the certificate should not be used. As described above, a certificate can become unusable (e.g., revoked or suspended) during its operational period. For example, a user's private key can become compromised. Since the certificate contains the public key that is associated with the compromised private key, the certificate should not be used.

To render a certificate unusable, the CA revokes or suspends the certificate. On a periodic basis, a CA issues a CRL that identifies the certificates that have been revoked or suspended since the last CRL was issued. FIG. 2 provides an example of a CRL report format. CRL 200 contains the name of the issuer of the CRL 202, the date of the CRL's issuance 204, and the date of the next CRL issuance 206.

An entry for each certificate that has been revoked or suspended since the last issued CRL is contained in area 214 of the report. Each entry contains the Certificate Serial Number 208, the Suspension or Revocation date and time 210, and possibly the reason for the suspension or revocation (e.g., private key is compromised) 212.

Each entry's Certificate Serial Number 208 in area 214 must be reviewed to determine whether a specific certificate is included in CRL 200. Area 214 can contain one or more entries. CRL 200 could be multiple pages. The following is an example of a certificate's serial number:

63992a43ef2e97a757cdb49c4c1d6014

The serial number in the example contains thirty two alphanumeric characters. If the entries in area 214 are sorted using field 208 (i.e., by serial number), it would be necessary to locate the area of the report at which the certificate's serial number would be located and verify by looking at the entries contained at that location. The entries could be very similar such that only one or two characters differ between the report entries and the certificate in question making it easy to mistakenly identify an entry as specifying or not specifying the certificate.

FIG. 3 provides an illustration of a set of CRLs. The set of CRLs consist of CRLs 304, 306, 308, 310, and 312. CRLs 306, 308, and 312 consist of more than one page. CRLs 304, 306, 308, 310, and 312 must be consulted to determine whether certificate 302 was revoked at a certain date and time. That is, each of the CRLs must be reviewed to determine whether the serial number assigned to certificate 302 is contained therein. Entry 322 in CRL 310 identifies certificate 302 as having been revoked.

Certificate Validation

A certificate must be checked against all outstanding CRLs each time before it is used to determine whether it is valid. The set of CRLs that could contain information about a revoked or suspended certificate are those issued during the validity period of the certificate. FIG. 4 provides a flow for validating a certificate at any point in time. At step 402, the certificate's serial number is obtained from the certificate. At step 406 (i.e., "all CRLs in set reviewed?"), a determination is made whether all CRLs in the set have been reviewed to locate the certificate. If so, it is assumed that the certificate has not been revoked or suspended during the period in question. If some CRLs remain, the next CRL in the set is reviewed at step 410.

The process documented in FIG. 4 may be performed manually or automatically, by a computer program. It is slow and tedious. The strength of the conclusion that a certificate is valid is dependent on whether the set of CRLs was a complete set (i.e., contained all of the issued CRLs) and the thoroughness of the individual or program that performs the review. The process is inefficient, prone to error, and inconclusive.

SUMMARY OF THE INVENTION

The validity status of a certificate is accessible even after the certificate has expired. Certificate validity status is stored and retained in a certificate status history database ("database") that allows for ease of certificate status retrieval. The validity status of a certificate can be determined for a specified point in time using the database. It is no longer necessary to review multiple CRLs to determine the validity status of a certificate. The invention eliminates the need to perform a CRL review in order to determine the status of a certificate. The invention has the advantage of being more efficient and accurate over the prior art technique.

The certificate status historical information includes its serial number; certificate ID or user ID; CA; issuance, renewal, expiration, revocation, and suspension dates and times; and comments or reasons for each of those actions.

The database can be stored as a relational DBMS, a file system structure, or using other storage techniques. A query capability is used to retrieve the stored information. A database operation can be performed to determine the status of a certificate (e.g., valid, expired, revoked or suspended) at a specified time. The response can return a conclusory response (i.e., valid or invalid). The response can also provide a history of the certificate. For example, the response can include the date(s) and time(s) of a certificate's renewal, expiration, revocation, and/or suspension along with a reason for each.

DETAILED DESCRIPTION OF THE INVENTION

A method and apparatus for managing key revocation is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 5:
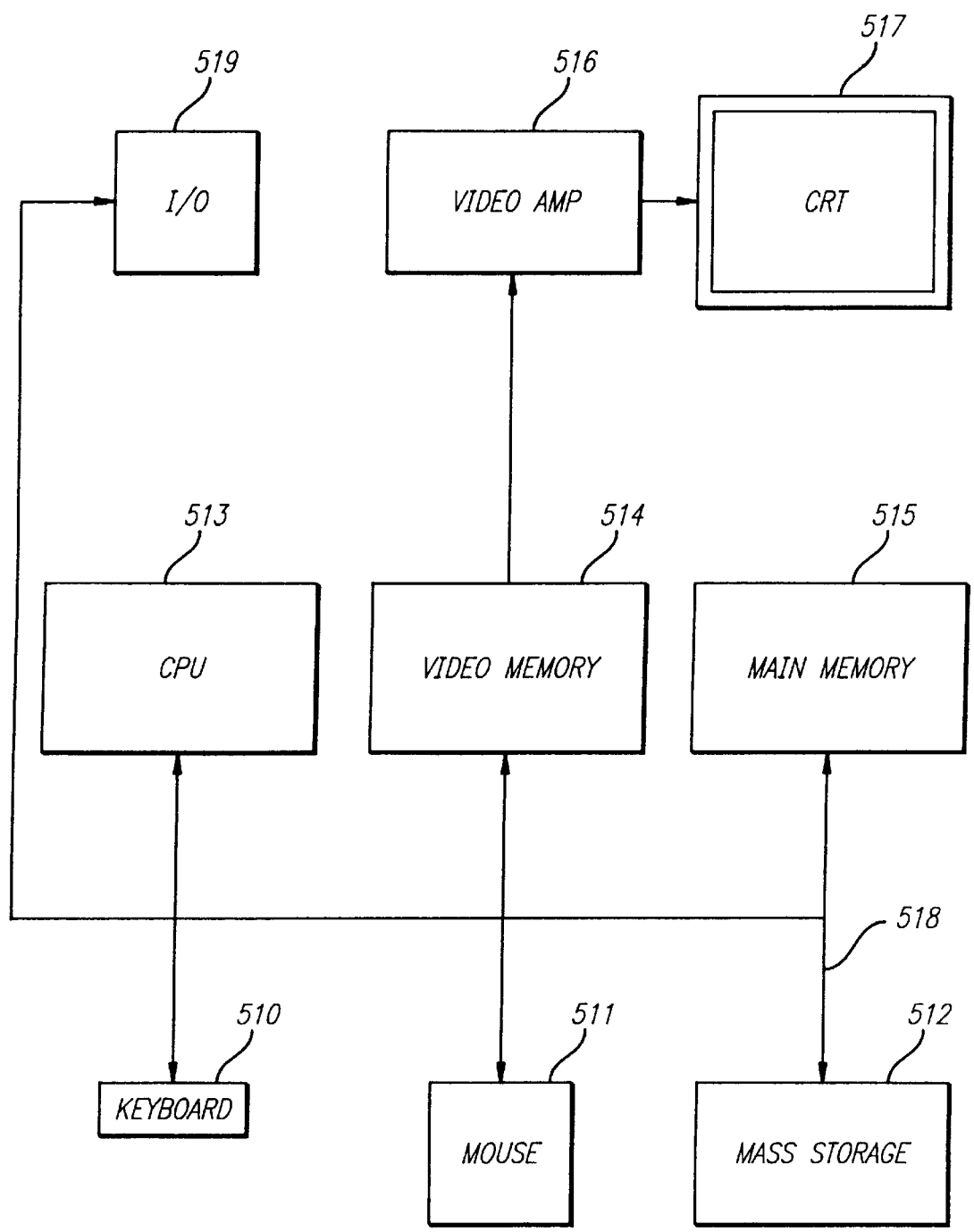
FIG. 5 provides an example of a general purpose computer that can be used in embodiment of the invention.

The present invention can be implemented on a general purpose computer such as illustrated in FIG. 5. A keyboard 510 and mouse 511 are coupled to a bi-directional system bus 518. The keyboard and mouse are for introducing user input to the computer system and communicating that user input to CPU 513. The computer system of FIG. 5 also includes a video memory 514, main memory 515 and mass storage 512, all coupled to bi-directional system bus 518 along with keyboard 510, mouse 511 and CPU 513. The mass storage 512 may include both fixed and removable media, such as magnetic, optical or magnetic optical storage systems or any other available mass storage technology. Bus 518 may contain, for example, 32 address lines for addressing video memory 514 or main memory 515. The system bus 518 also includes, for example, a 32-bit DATA bus for transferring DATA between and among the components, such as CPU 513, main memory 515, video memory 514 and mass storage 512. Alternatively, multiplex DATA/address lines may be used instead of separate DATA and address lines.

In the preferred embodiment of this invention, the CPU 513 is a 32-bit microprocessor manufactured by Motorola, such as the 680X0 or Power PC processor or a microprocessor manufactured by Intel, such as the 80 X86, or Pentium processor. However, any other suitable microprocessor or microcomputer may be utilized. Main memory 515 is comprised of dynamic random access memory (DRAM). Video memory 514 is a dual-ported video random access memory. One port of the video memory 514 is coupled to video amplifier 516. The video amplifier 516 is used to drive the cathode ray tube (CRT) raster monitor 517. Video amplifier 516 is well known in the art and may be implemented by any suitable means. This circuitry converts pixel DATA stored in video memory 514 to a raster signal suitable for use by monitor 517. Monitor 517 is a type of monitor suitable for displaying graphic images.

The computer system described above is for purposes of example only. The present invention may be implemented in any type of computer system or programming or processing environment.

The invention provides a mechanism for determining the status of a certificate and has the advantage of being more effective, efficient and accurate than the prior art technique. This invention minimizes the delay introduced into the prior art technique (e.g., due to distribution of CRLs) thereby optimizing the timeliness and insuring the accuracy of certificate status. In the preferred embodiment of this invention, a Database Management System (DBMS) is used to store historical status information associated with a certificate. The Data Manipulation Language (DML) of the DBMS is used to retrieve certificate status information. Preferably, a relational DBMS is used with the invention such as Oracle's relational DBMS products. Structured Query Language (SQL) is an example of a DML that can be used with the invention.

The invention can be used to determine the status of a certificate at a given point in time. For example, one wishing to determine the authenticity of an aged digital signature associated with a document (e.g., a ten year-old digital signature) using its certificate can use the invention to determine whether the certificate was valid at the time of the digital signature. Instead of accessing multiple CRLs to determine the certificate's status as in the prior art, a query is used to retrieve the certificate's status at that time. The invention eliminates the need to access a set of CRLs. Further, the invention provides the ability to efficiently and accurately determine the status of a certificate regardless of whether it is or is not expired.

The invention can also be used to generate a report of the status of one or more certificates. It is possible, for example, to generate a CRL using the invention. A report can be produced that itemizes the validity history of a single certificate from its creation to its expiration. The report can identify the periods during which the certificate was suspended, reinstated and when it was revoked. Other reports are possible using the invention.

Overview

Figure 6:
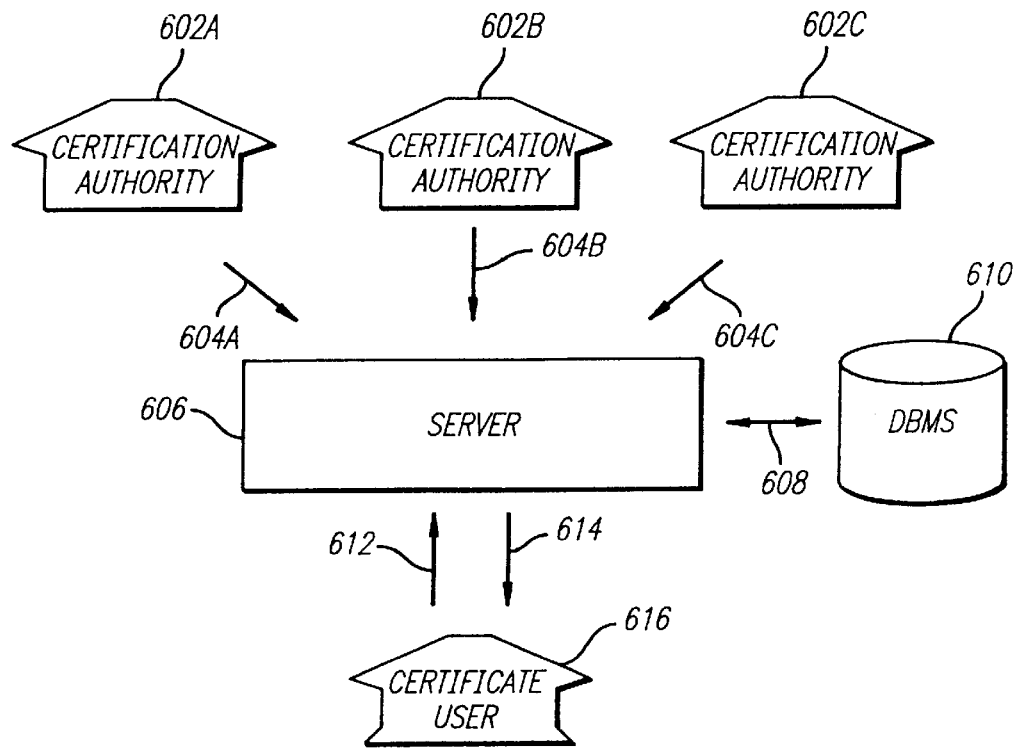
FIG. 6 provides a overview of components and participants according to an embodiment of the invention.

A database containing certificate status information is populated using information received from an entity that modifies the status of a certificate (e.g., a CA). The database retains information about a certificate even though it may have expired. It is possible to query the database to determine the status of a certificate at a given point in time. FIG. 6 provides an overview of components and participants used in one embodiment of the invention.

Certification authorities 602A–602C issue digital certificates and modify the status of their certificates. A change in status of a certificate is sent to server 606 via connections 604A–604C. The change in status can be reported by the CA in the form of a CRL, for example. Server 606 can be a computer system such as that described in FIG. 5. Alternatively, server 606 can be a mainframe or minicomputer, for example. Server 606 stores certificate status information in DBMS 610. DBMS 610 is preferably a relational DBMS and the certificate status information is stored in one or more tables or relations in DBMS 610. A DML such as SQL is used to manipulate the information stored in DBMS 610. The DBMS may contain other information including, for example, the certificate itself.

To determine the status of a certificate, certificate user 616 accesses DBMS 610 via server 606. A request for certificate status information is sent via connection 612. The request can be in the form of an SQL query, for example. Alternatively, the request can identify the name of an operation that is performed by server 606 (e.g., getStatus). A unique identification is provided for the certificate by certificate user 616.

Upon receipt of the request, server 606 accesses DBMS 610 via connection 608 to retrieve the requested information. If, for example, certificate user 616 requested the status of a certificate, server 606 accesses DBMS 610 to retrieve the certificate status. The information retrieved by server 606 from DBMS 610 is returned to certificate user 616 via connection 614. Certificate user 616 can affirm the validity of a certificate based on the information provided by server 606, for example.

Figure 7:
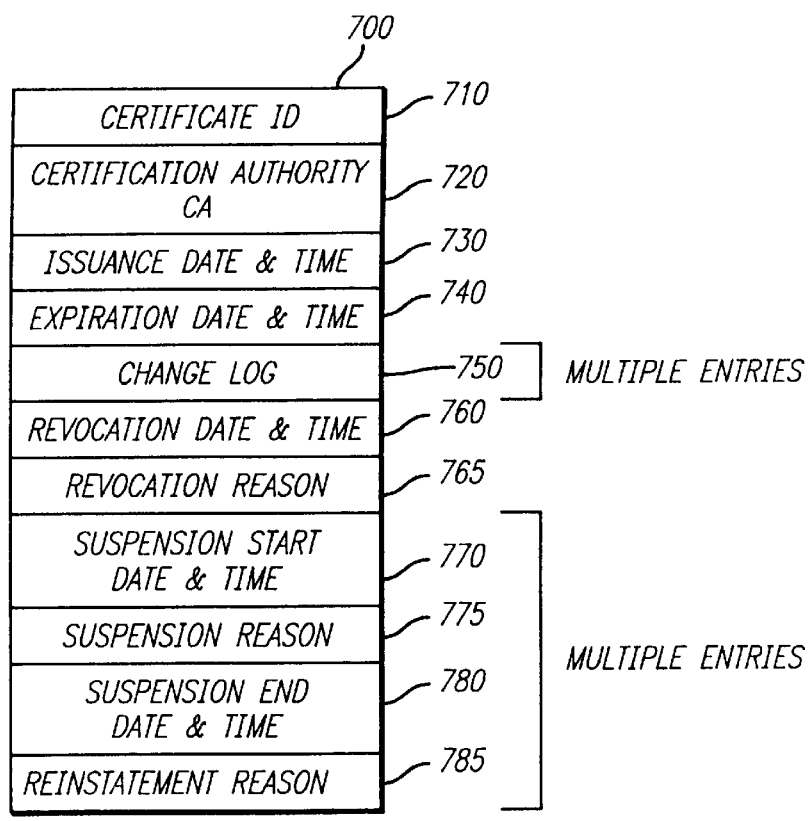
FIG. 7 provides an example of certificate status historical information stored in a DBMS according to an embodiment of the invention.

A centralized configuration is illustrated in FIG. 6 wherein CAs 602A–602C transmit certificate validity information to a central DBMS (DBMS 610). However, it should be apparent that other configurations can be used in the invention. For example, CAs 602A–602C can each have a DBMS to store certificate validity information for its own certificates (e.g., the certificates that it issues). Certificate user 616 sends a request for information about a certificate to the appropriate CA. Alternatively, user 616 can send a request to any one of the CAs and the request is forwarded to the CA that can service it, if the request is received at the wrong CA. Database In a relational implementation of DBMS 610, one or more tables or relations are used to store certificate validity information. FIG. 7 provides an example of information stored in a DBMS according to an embodiment of the invention.

DBMS 610 is comprised of table 700 containing multiple data fields. Field 710 contains the certificate ID. Field 720 identifies the CA that issued the certificate. As previously discussed, a certificate ID is unique within each issuing CA. Thus, fields 710 and 720 can be combined to form a unique key into DBMS 610. Certificate user 616 supplies a certificate ID and identifies the issuing CA to uniquely identify a certificate for which status information is being requested.

A certificate's issuance date and time are provided in field 730 and its expiration date and time are in field 740. Certificate user 616 can request expiration information contained in these fields to verify the expiration information that may be provided in the certificate itself. Field 750 is a change log which is a record of all changes made to the certificate status, and may have multiple entries. If a certificate has been revoked, the date and time that the certificate was revoked are provided in field 760. The date and time that a certificate was suspended are provided in field 770. It is possible, that the certificate is reinstated after a suspension. The date and time of the reinstatement are provided in field 780. The reason for revocation is stored in field 765, the reason for suspension is stored in field 775, and the reason for reinstatement is stored in field 785. It may further be possible that a certificate is suspended and reinstated more than once. Additional fields or a separate, related table can be used to store suspension and reinstatement information, if needed.

In the prior art, certificate user 616 had to review a set of CRLs generated by a CA to determine whether a certificate was valid on a certain date. With the invention, certificate user 616 can efficiently determine the status of a certificate. A certificate's status information is stored in a DBMS allowing for direct access to the information even though the certificate has expired. Certificate user 616 merely identifies the certificate and the query operation that is to be performed on the database. For example, certificate user 616 can query whether a certificate was valid on Dec. 5, 1991. A query of DBMS 610 can provide an answer (e.g., a simple "yes" or "no"). There is no need to review multiple CRLs to determine the answer to that question. The invention provides a mechanism for retrieving certificate status information for a certificate regardless of whether it is or is not expired.

Process Flow

Figure 8:
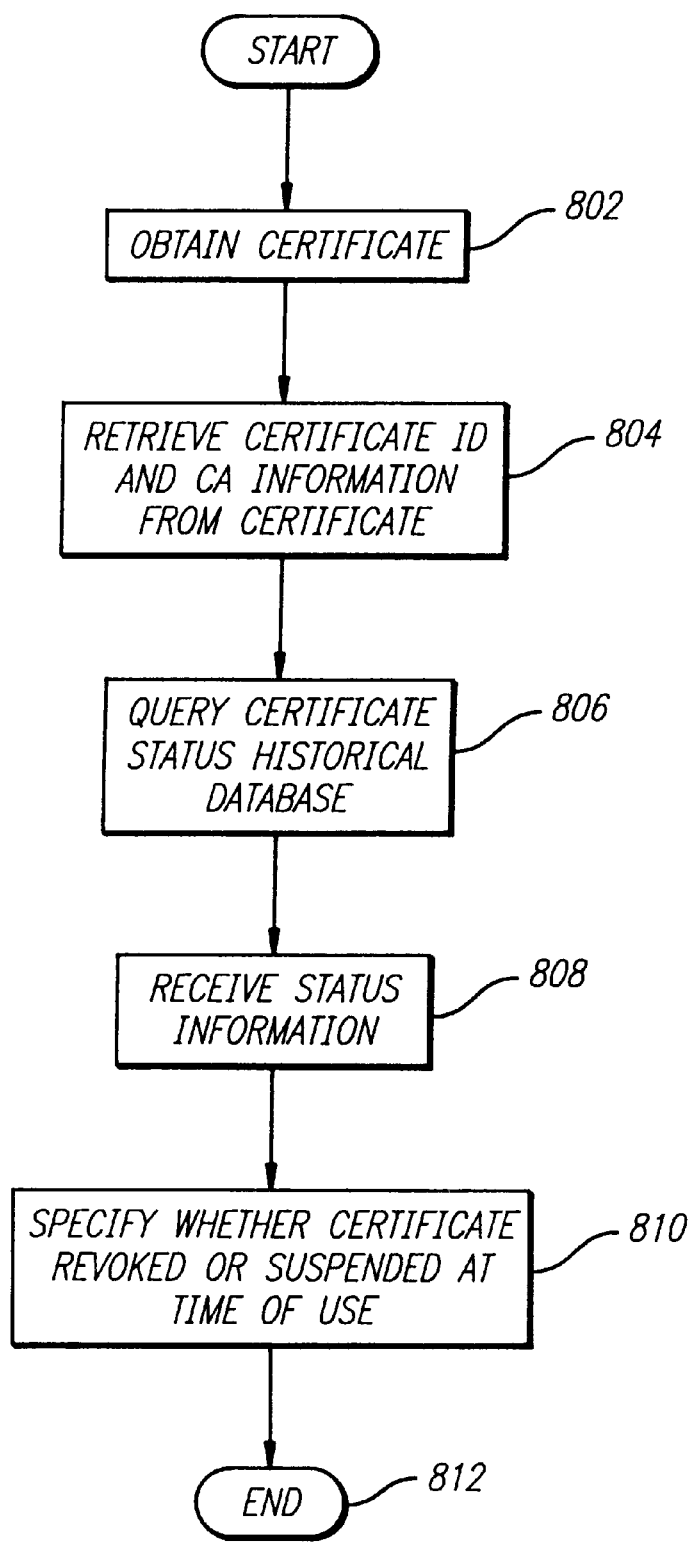
FIGS. 8 provides a flow diagram for determining the status of a certificate according to an embodiment of the invention.

The invention is used to determine the status of a certificate. FIG. 8 provides a flow diagram for determining the status of a certificate according to an embodiment of the invention.

Figure 1:
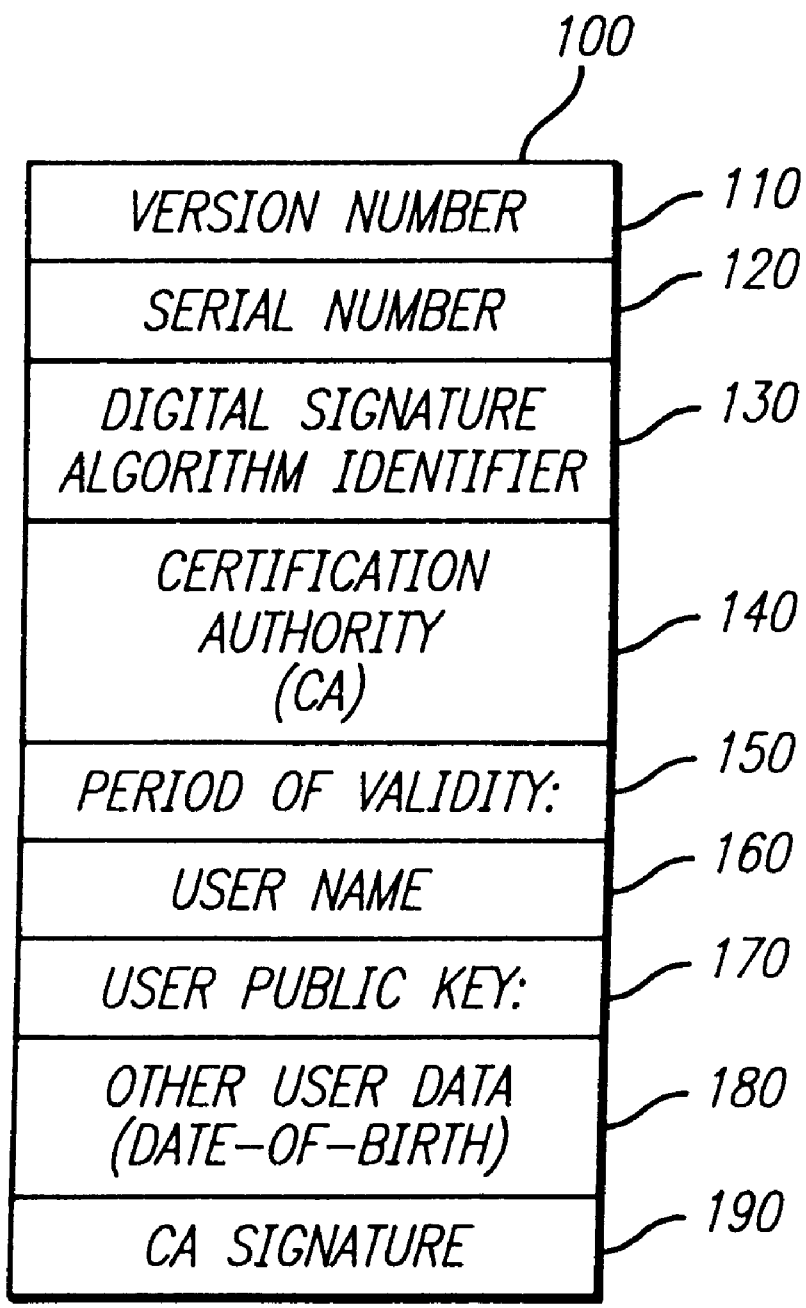
FIG. 1 provides an example of a certificate.
Figure 2:
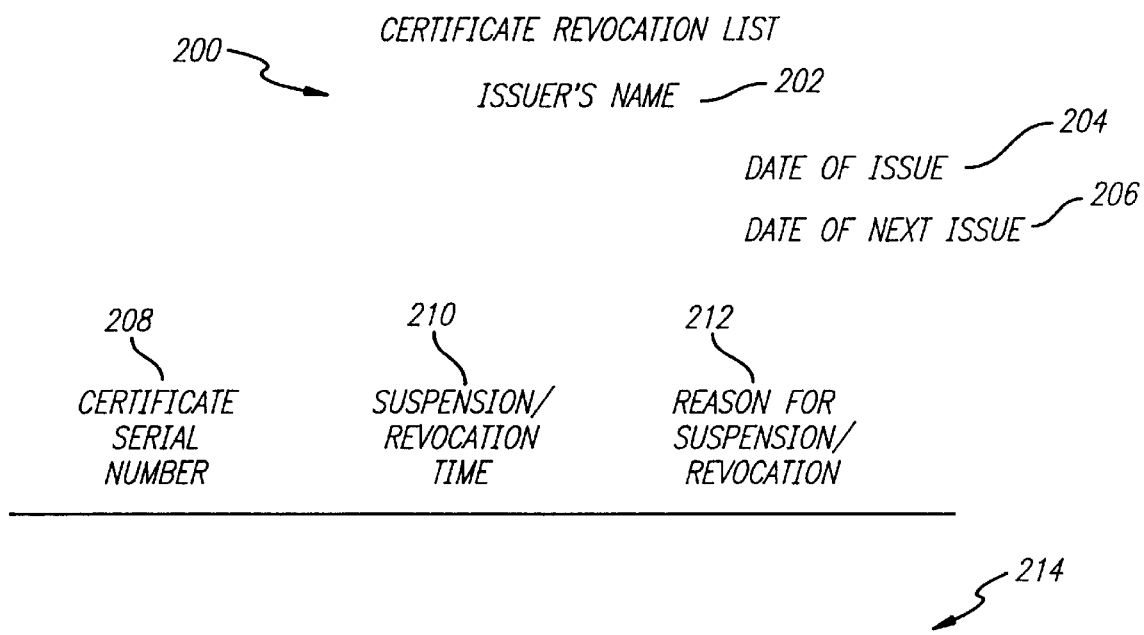
FIG. 2 provides an example of a CRL report format.
Figure 3:
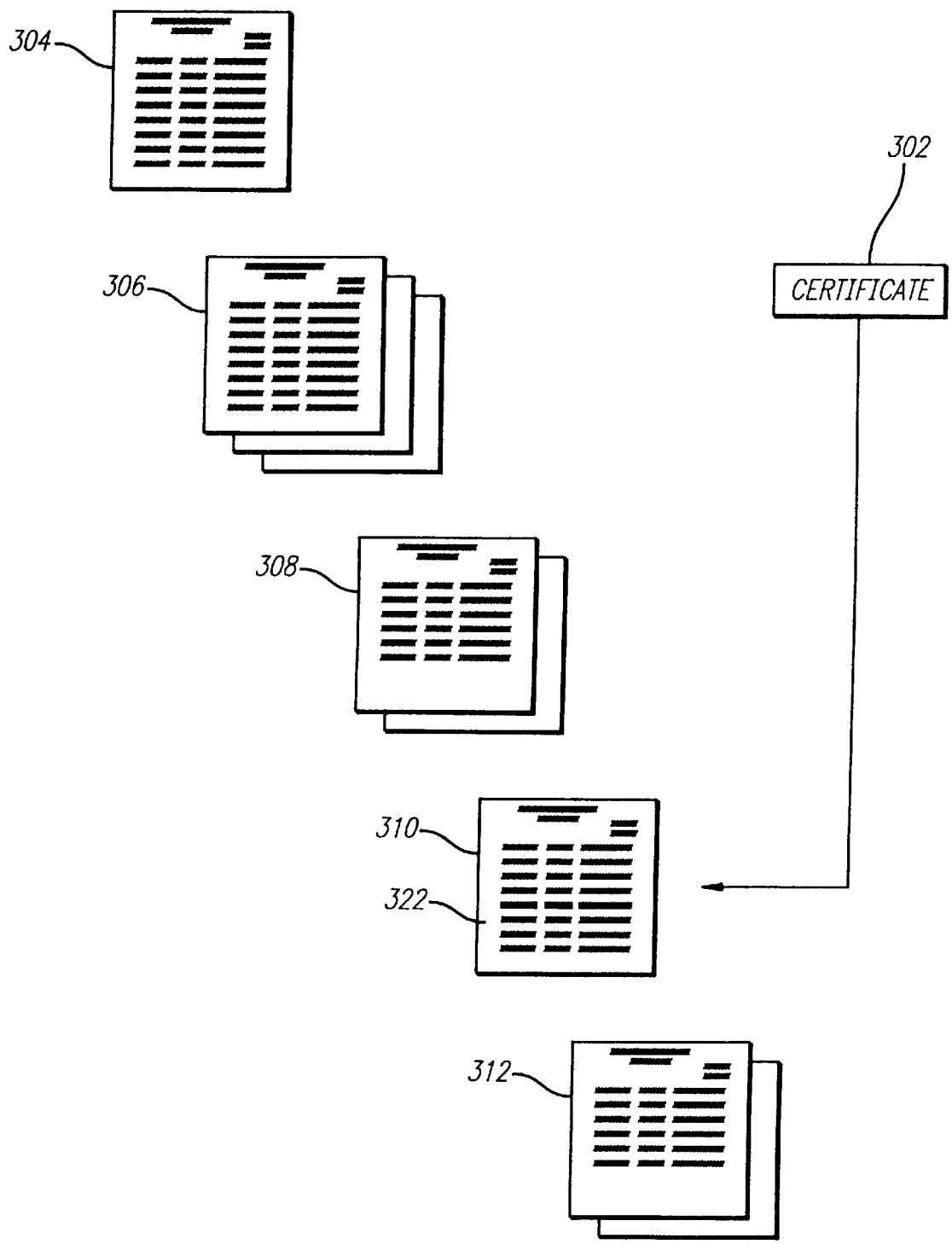
FIG. 3 provides an illustration of a set of CRLs.
Figure 4:
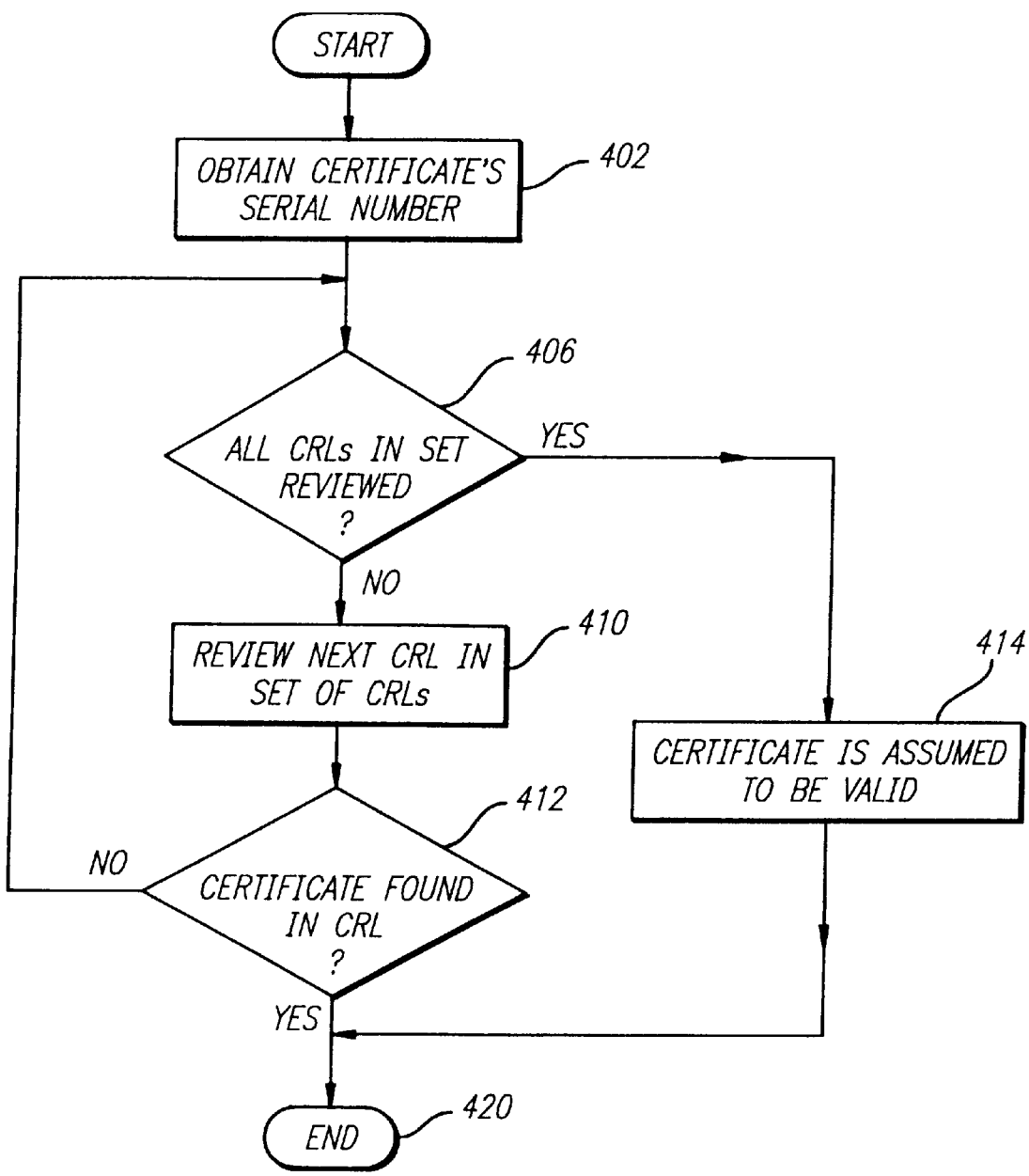
FIG. 4 provides a flow diagram for validating a certificate.

At step 802, the certificate is obtained. A certificate can be obtained from a CA. For example, certificate user 616 can request a certificate from a CA (e.g., CA 602A, 602B or 602C). At step 804, the certificate ID and CA are retrieved from the certificate (see FIG. 1). At step 806, a request for status information is sent to DBMS 610. For example, certificate user 616 can send the following request:

getStatus (certificate ID, CA, date)

In the sample request, certificate user 616 is requesting the status of a certificate on a specified date. Server 606 receives the request and queries DBMS 610 for the status of the certificate. A reply is generated based on the certificate information stored in DBMS 610 and is sent to certificate user 616. The reply is received by certificate user 616 at step 808. The reply can state that the certificate was either "valid" or "invalid" on the specified date. Alternatively, a reply can include the date, time and reason for the revocation or suspension.

At step 810 (i.e., "certificate revoked or suspended at time of use?), a specification is made whether the certificate was valid at the specified time. If the certificate was invalid at that time, it is not usable and certificate processing ends at step 818. If it was valid, the certificate may be usable, depending on the integrity of the CA digital signature on the certificate.

Thus, a method and apparatus for managing key revocation has been provided.

What is claimed is:

1. A method of determining the status of a certificate comprising the steps of:

creating one or more tables;

obtaining information regarding a certificate, said information including information regarding the operational period of a certificate;

storing said information in said one or more tables, said information retained in said one or more tables independent of said certificate's operational period; and obtaining from said one or more tables a validity history for said certificate.

2. The method of claim 1 wherein said information includes a change log comprising a record of all changes to a status of said certificate.

3. The method of claim 2 wherein said status identifies whether said certificate was revoked at a specified time.

4. The method of claim 1 wherein said one or more tables are tables in a DBMS.

5. The method of claim 4 wherein said DBMS is a relational DBMS.

6. The method of claim 1 wherein said one or more tables are stored as files in a file system.

7. The method of claim 1 wherein said one or more tables are stored in a centralized location.

8. The method of claim 1 wherein said storing step further comprises the steps of:

receiving a list of certificates whose status has changed;

importing the content of said list into said one or more tables.

9. An article of manufacture comprising:

a computer usable medium having computer readable program code embodied therein for determining the status of a certificate having an operational period comprising:

computer readable program code configured to cause a computer to create one or more tables;

computer readable program code configured to obtain information regarding a certificate, said information including information regarding the operational period of said certificate;

computer readable program code configured to cause a computer to store said information in said one or more tables, said information retained in said one or more tables independent of said certificate's expiration date;

computer readable program code configured to cause a computer to obtain from said one or more tables a validity history for said certificate.

10. The article of manufacture of claim 9 wherein said information includes a change log comprising a record of all changes to a status of said certificate.

11. The article of manufacture of claim 10 wherein said status identifies whether said certificate was revoked at a specified time.

12. The article of manufacture of claim 9 wherein said one or more tables are tables in a DBMS.

13. The article of manufacture of claim 12 wherein said DBMS is a relational DBMS.

14. The article of manufacture of claim 9 wherein said one or more tables are stored as files in a file system.

15. The article of manufacture of claim 9 wherein said one or more tables are stored in a centralized location.

16. The article of manufacture of claim 9 wherein said code configured to cause a computer to store further comprises:

computer readable program code configured to cause a computer to receive a list of certificates whose status has changed;

computer readable program code configured to cause a computer to import the content of said list into said one or more tables.

17. A method of determining the status of a certificate at a particular point in time comprising the steps of:

creating one or more tables;

obtaining information regarding at least one certificate, said information including information regarding the operational period of said at least one certificate;

creating a validity history for a certificate beginning with its creation;

storing said validity history in said one or more tables, said validity history retained in said one or more tables independent of a particular certificate's operational period; and determining from said one or more tables the status of a particular certificate at a particular time.

18. The method in accordance with claim 17 wherein said information includes information regarding the suspension of one or more certificates.

19. The method in accordance with claim 17 wherein said information includes a change log for a particular certificate.

20. The method in accordance with claim 17 including the step of providing a validity history report for at least one certificate from said in formation.

* * * * *